United States Patent
Ray (10) Patent No.: US 9,785,827 B1
(45) Date of Patent: Oct. 10, 2017

(54) PROCESS TO AID IN MOTIVATION OF PERSONAL FITNESS, HEALTH MONITORING AND VALIDATION OF USER

(71) Applicant: Salina Dearing Ray, Belleair Bluffs, FL (US)

(72) Inventor: Salina Dearing Ray, Belleair Bluffs, FL (US)

( * ) Notice: Subject to any disclaimer, the term of this patent is extended or adjusted under 35 U.S.C. 154(b) by 256 days.

(21) Appl. No.: 14/489,349

(22) Filed: Sep. 17, 2014

Related U.S. Application Data (63) Continuation-in-part of application No. 13/764,440, filed on Feb. 11, 2013, now abandoned.

(51) Int. Cl.
  *G09G 5/00* (2006.01)
  *G06K 9/00* (2006.01)

(52) U.S. Cl.
  CPC ..... *G06K 9/00342* (2013.01); *G06K 9/00087* (2013.01); *G06K 9/00288* (2013.01); *G06K 9/00617* (2013.01)

(58) Field of Classification Search
  CPC . A63B 71/06; A63B 24/0075; A63B 24/0062; G06F 19/3437; Y10S 128/922
  USPC ......................................... 482/1, 8; 345/156
  See application file for complete search history.

(56) References Cited

U.S. PATENT DOCUMENTS

| | | | |
|---|---|---|---|
| 7,204,425 B2 | 4/2007 | Mosher, Jr. et al. | |
| 7,328,119 B1 | 2/2008 | Pryor | |
| 7,693,584 B2 * | 4/2010 | Pryor | A63B 71/06 482/8 |
| 8,306,635 B2 | 11/2012 | Pryor | |
| 8,433,094 B1 * | 4/2013 | Nguyen | G06F 3/011 382/103 |
| 8,719,202 B1 * | 5/2014 | Maeng | G06N 99/005 482/1 |
| 2004/0131227 A1 * | 7/2004 | Bravomalo | G06Q 30/0269 382/100 |
| 2005/0168340 A1 | 8/2005 | Mosher, Jr. | |
| 2008/0242231 A1 * | 10/2008 | Gray | H04M 1/72563 455/66.1 |

(Continued)

OTHER PUBLICATIONS http://www.biolinksolutions.com/technology/voice.php.

(Continued)

*Primary Examiner* — Michael Pervan
*Assistant Examiner* — Andrew Lee
(74) *Attorney, Agent, or Firm* — Taft Stettinius & Hollister, LLP; Ryan O. White (57) ABSTRACT

A system for displaying a motivational image of a user on an electronic device that includes at least a camera and a display. The system includes an adjustable mount for the electronic device that is adapted to orient the camera and display of the electronic device towards the user. The electronic device, upon detection of movement by the camera, is adapted to display the motivational image, such as a thinner representation of the user, on the display in accordance to the speed or duration of the detection of the movement of the user. The electronic device may be adapted to further receive an input from the user in order to calculate the amount of exercise required for the user to achieve the desired weight. Further, the system is able to validate the user's identity and exercise achieved as well as providing health screenings using biometric testing.

23 Claims, 3 Drawing Sheets

(56) References Cited

U.S. PATENT DOCUMENTS

| | | | |
|---|---|---|---|
| 2009/0233769 A1* | 9/2009 | Pryor | B60K 35/00 482/8 |
| 2012/0041767 A1* | 2/2012 | Hoffman | A63B 24/0059 705/1.1 |
| 2012/0081282 A1* | 4/2012 | Chin | G06F 3/011 345/156 |
| 2013/0120445 A1* | 5/2013 | Shimomura | G06F 3/017 345/629 |
| 2013/0190135 A1 | 7/2013 | Pryor | |

OTHER PUBLICATIONS http://en.wikipedia.org/wiki/Speaker_recognition.
http://hbr.org/2010/12/whats-the-hard-return-on-employee-wellness-programs/ar/6.
OneTouch® Verio®Sync http://www.onetouch.com/veriosync.
http://www.ihealthlabs.com/glucometer/.
Vital Signs Camera App by Phillips: http://www.vitalsignscamera.com.
http://www.fst21.com.
Wahoo Fitness (http://www.wahoofitness.com).
FitBit (http://www.fitbit.com).
Jawbone (http://jawbone.com).
Runkeeper (www.runkeeper.com).

* cited by examiner

PROCESS TO AID IN MOTIVATION OF PERSONAL FITNESS, HEALTH MONITORING AND VALIDATION OF USER

CROSS-REFERENCE TO RELATED APPLICATIONS

This application is a Continuation-in-Part of U.S. Utility patent application Ser. No. 13/764,440, filed on Feb. 11, 2013, and incorporated herein by reference.

STATEMENT REGARDING FEDERALLY SPONSORED RESEARCH AND DEVELOPMENT

Not Applicable.

FIELD OF THE INVENTION

This invention relates to identify validation, and more particularly to a method of validating the identity of a user.

BACKGROUND

Obesity is growing faster than any other public health issue in America. If current trends continue, 103 million American adults will be considered obese by 2018. The U.S. is expected to spend $344 billion on health care costs attributable to obesity in 2018.

Obesity-related direct expenditures are expected to account for more than 21 percent of the nation's direct health care spending in 2018. Obesity has become an epidemic with no signs of slowing down. Solving this problem starts with motivation and our current methods of motivating people to exercise are obviously not working; the obesity numbers are getting worse.

The problem of lack of motivation to exercise has been partially solved by the implementation of video gaming while exercising. Inventions disclosed in U.S. Pat. No. 7,328,119 to Pryor on Feb. 5, 2008; U.S. Pat. No. 7,693,584 to Pryor on Apr. 6, 2010; and U.S. Pat. No. 8,306,635 to Pryor on Nov. 6, 2012 all address exercise motivation through the use of video gaming, and Pryor compares his invention to an improvement of Nintendo games. A problem with the use of gaming for exercise motivation is that it appeals to a much smaller and younger population; not the target age group that most needs to lose weight and that is costing our healthcare industry an exorbitant amount of money.

Our target ages to combat the obesity epidemic are between the years 25 to 60. This is the age population that is overweight or obese. Although using gaming as a means to encourage children and teenagers to exercise may in fact prove to be successful, it fails to solve the problems of low self-esteem and lack of motivation that can be accomplished by the proposed invention by creating positive emotions in the user, by increasing the user's internal dialog and by awakening the user's desire for autonomy and self-determination as disclosed here. University studies show that affecting someone's intrinsic motivation and improving upon their self-efficacy has proven to drastically motivate people to exercise long term and it also affects their diet choices. In addition, my findings indicate that a thinner, more appealing image a person sees of himself while exercising remains in his mind long after the completion of his workout, often while he selects food while shopping and when dining at restaurants. It is my belief that a person's food choices will not be improved by gaming nor will gaming enhance the user emotionally or intrinsically. My findings show and universities prove that the psychology affected by the present invention will have a profound effect on a person's motivation to exercise and diet choices.

Pryor's inventions claim that the user can see a projected image of himself in the future as a result of his inputted exercise routine and diet plan, for example 30 minutes for 3 times a week and a selected diet plan. But such inventions fail to motivate the user because they do not provide a real-time image of the user getting thinner and more attractive the harder and faster he walks or runs on the treadmill, for example, as disclosed herein. One key is the direct connection between the harder the user exercises the thinner the image gets that is portrayed to the user in real time while exercising as disclosed in this invention. Pryor's invention has a disadvantage in that it does not affect or engage the user in this way while exercising. Pryor's invention does not include an image of the user improving in relation to the intensity of the exercise then being performed which, if included, would encourage the user to work harder. Some people simply cannot imagine what a thinner them would look like. By showing them their payoff in advance by displaying a thinner image in real-time while exercising, they are more motivated to exercise much harder and longer than they would be otherwise.

Pryor's Continuation Patent Application US2013/0190135, published on Jul. 25, 2013, further addresses user motivation and rehabilitation regimens through remote instruction. I find that using instruction to exercise may be useful in the short term, but it fails to solve the problem of self-determination and autonomy within in the user, thereby creating positive long term beneficial diet and exercise habits.

U.S. Pat. No. 7,876,368 to Craig et al. on Jan. 25, 2011 teaches a sliming effect method for digital photographs. Such a system makes no mention of use with real-time video alteration of a scene captured by a camera. Further, such a method makes no mention of modifying certain areas of an image (such as the thickness of a person's upper arms or size of their chin, for example). As such, use of such a system for displaying in real-time a motivational image of an exerciser who is exercising in front of a camera is not possible. Further, such a method does not predict a future, thinner appearance for a person based on their current appearance, a known previous appearance, and a particular combination of diet and exercise plans over a given time.

Pedometers such as FitBit (http://www.fitbit.com), Jawbone (http://jawbone.com), and Runkeeper (www.runkeeper.com) attempt to track the number of steps the user takes in a given period of time. They are intended to assist the user in being aware of the amount of exercise he is getting and by keeping a journal of diet and exercise. However, such devices do not motivate the user to exercise.

Employee wellness programs have proven to help in the battle against weight control and poor health, but I have found a need that exists for creating synergy between the employee, the employer and the healthcare provider that would exponentially increase employee participation. The present invention has significant advantages for personal health care and telemedicine that also saves money for the employee, the employer and the healthcare company. Motivation to exercise, validation of the user and biometric testing are now brought together into a single streamlined flow of information to the wellness program manager, physician and personal trainer in a way that was not available previously, but that is greatly needed.

Current wellness programs rely upon swipe cards that the employee uses when entering the gym and/or a pedometer, such as Fitbit or Jawbone, that tracks everyday activity like the number of steps walked, the amount of distance travelled, the number of stairs climbed and the amount of time a person is active. They also track your diet, weight and sleep. Another pedometer device, Runkeeper, tracks a user's pace, measures the user's workout distance, charts the user's weight loss and includes a GPS system all within an application running on an iPhone, for example. However, these devices do not provide a solution to the number one cause of obesity, which is lack of motivation to exercise and eat properly.

These prior art devices also can fail to accurately validate identify the user. In fact, swipe cards and pedometer devices can be easily manipulated by wellness program participants. For example, a wellness program participant can give his swipe card to a friend who goes to the same fitness center to exercise, thus enabling the inactive wellness program participant to obtain false wellness program credit for exercise performed by another. In similar fashion, an inactive wellness program participant can easily obtain false exercise credit with pedometer devices by lending them to an active friend who registers a high volume of wellness program credit as compared to the inactive participant. Indeed, many pedometer devices can be shaken by an inactive wellness program participant (or her friend) while sitting on the couch watching television, the end result being additional false program credit for the dishonest participant.

There is undoubtedly a need for a device that unmistakably validates the true identity of the user. With the information disclosed herein, the wellness program participant is able to exercise at a convenient and secure place, such as at home or in a hotel, and at a preferred time while registering true wellness program credit. This would save time and money, especially for the working mother, while simultaneously reducing fuel consumption, traffic and pollution. Most wellness programs provide financial incentives for completion of fitness goals and this validation feature would ensure that the program participants that truly deserve this credit would receive it while the dishonest program participants would not.

By using a portable computing device such as an iPad tablet or the like, the employee can enjoy the convenience and security of completing her exercise in hotel gym to receive her wellness program credit and the benefits of more frequent exercise. All of this information is easily transferred over the internet to a wellness manager or medical advisor as a live feed or stored on a computer or remote server such as a cloud-based server in order to obtain data at any time or location.

In a smart-phone application called Wahoo Fitness (http://www.wahoofitness.com), a body band is used around the chest to gather basic information during exercise, such as tracking of the heart rate, calories burned, distance, and speed. Although this may be informative to the user, it's missing the first step in the process which is getting someone motivated to exercise. Further, it fails to motivate and engage the user because it falls short in producing a real time thinner image of the user during her workout routine based on the data that is read from the band or validating the user and providing biometric testing.

Facial recognition applications, such as that available at http://www.fst21.com, are used for identifying a person from a previously stored digital image or video frame of that person. Therefore, it is possible to compare the current facial image of a user to a stored facial of that individual to confirm the identity of the user. FST Biometrics, a company that provides secure access systems to various types of buildings and schools, can integrate its application with security and surveillance systems to validate a person's identity before permitting entry by that person. However, this application addresses the security needs of facilities, while the invention described herein solves the critical needs of the healthcare, diet and fitness industries which are motivation to exercise and validation of the wellness program participant.

The current options to address the need of biometric screening of employees involve either the employee travelling to a medical facility or the use of mobile biometric screening facilities that travel to the workplace. Such prior art solutions are discussed in more detail at http://www.concentra.com/employers/workforce-health-and-well-being/ and http://www.wellnesscorporatesolutions.com. Although the latter method provides a level of convenience and efficiency to the employer and employee, the use of computing devices coupled with various health screening peripherals by employees to perform their own biometric screening at home provides the highest level of convenience, efficiency, privacy and participation in favor of both the employee and the employer. Computing devices such as laptops, tablets and cell phones are able to interface with biometric screening devices used in the home to conduct tests to determine cholesterol levels, blood-glucose levels, blood pressure and the like and store and transmit that information to physicians and other medical professionals. Indeed certain test strips that are currently on the market will turn a certain color when a small drop of blood is placed on such a test strip. By scanning this test strip with a cell phone, tablet or laptop camera, the computing device can read these slight color variations on the strips and provide the user with a precise reading of his blood sugar and cholesterol levels. However, the use of such devices at home by the patient, with the current prior art, there is no way to simultaneously confirm the identity of the user as disclosed in the current invention.

Disadvantages that exist in the prior art include disconnection between, for example, the employee needing motivation, the employer needing employee participation, and wellness programs needing to validate the user's identification and biometric testing.

Further, there is a disconnection between the medical community and patients with regard to validation of a patient's exercise performance. Poor self-worth and lack of self-esteem that exist with overweight people often fosters a lack of motivation to exercise, which compounds the problem and our exorbitant health care cost in the US. Further, diabetes and obesity rates on the rise, burdening our healthcare system and the economy in US. Employers lose time at work from employee due to obesity-related illnesses, and employers' costs to have a wellness program in-house is a further expense to the employer.

Therefore, there is a need for a system that can modify in substantially real-time, an image of a user in order to present a motivating image of the user getting thinner, for example. Such a needed system would be able to interface with various exercising machines, and would include an adjustable mount for optimally positioning the electronic device. Further, such a needed device would provide calculations to the user concerning diet and exercise plans needed to achieve a particular estimated appearance within a certain period of time. The present invention accomplishes these objectives.

SUMMARY OF THE INVENTION

The invention, through the use of robust image capturing, processing and analysis software that utilizes the camera on a computer device and creates a real-time thinner image of the user, is then displayed on a screen that the user views while exercising. This can be used on any computer device including but not limited to a television, cell phone, tablet, laptop or desk top computer, or the like. The image displayed to the user is real-time, similar to Skype and Face Time or it can be shown as a still image. In accordance with the present invention, a new and unique outcome of the user's thinner, healthier and more aesthetically pleasing image is achieved by the exercise machine interfacing with the computer device, by body bands interfacing with the computer device, by manual inputs from the user or by the camera on the computer device detecting the user's movement. An electronic skin patch and wearable health monitors such as bracelet or ear piece may also interface with the computer device to create the thinner image. A foot band is used for extrapolating the current weight and is interfaced with the computer device. It can be used in addition to or rather than the user inputting their weight into the computer device directly. The interface between devices can be achieved through wire or wireless Bluetooth, infrared technology or the like.

This discussion will focus primarily on the use of the invention in connection with a treadmill when interfacing with an exercise machine to create the thinner image in order to explain the invention in simple terms, but it should be understood that the invention is able to interface with any type of exercise machine, such as an exercise bike, an elliptical machine, a stair stepper and the like. It can also be used without an exercise machine such as while the user is doing floor exercises in front of the camera on the computer device. It can also be used to simply see what the user's thinner image would look like or for the study of psychology in self imagery or the like. The user inputs personal data such as gender, age, height and weight and personal measurements and then the user inputs the weight that they would prefer to be and the image will be displayed thinner accordingly. In this last case, the image thinning of the user is achieved by data manually entered by the user into the computer device in order to see their thinner image.

When using an exercise machine such as a treadmill, the action of the interface between the treadmill and the computer causes the user's image to become thinner, healthier and more aesthetically pleasing. Therefore, the faster and/or more intensely the user exercises, the thinner and more appealing the user's image becomes. In addition to seeing her image, she can also view on the display her exercise data such as heart rate, calories burned and distance advanced. The thinner image is able to be transferred in real time while exercising via the internet to someone such as a doctor, wellness manager or the like. A still image of the user's thinner image can be transferred as well. For convenience at home or in a gym it is also possible to operate the controls of the exercise machine through the computer device such as a tablet in order to move between various exercise machines and have data from the user's exercise routine automatically entered into the computer device such as heart rate, duration and calories burned.

The synergy of the computer device interfacing with the exercise equipment allows the controls of the exercise machine be accessed directly from the computer device. This allows a convenient method of operating the exercise machines while moving from different exercise machines in a gym or at home. The computer device is able to record the details of the user's workout session. Simultaneously, using the validation and biometric features of the invention, further explained below, allows a complete data report, including proof of the identification of the user or patient, biometrics and exercise report be sent via the internet to a health professional or wellness manager. This can be sent via live feed or stored on a computer or cloud based server to be viewed at any time.

Visually seeing the thinner image can be achieved all in one computer housing or could also be achieved by using a camera on a computer device to input users image and thinner image outputted from the same computer device, but projected separately on another area such as a large wall or remote display, thereby allowing a large visual display of the user.

It is well-known that many overweight people have poor self-esteem and are disappointed with their appearance which further compounds the individual's lack of motivation to exercise and improve upon their overall health. The purpose of this invention is to improve the users' internal dialog and self-esteem by seeing themselves thinner and more fit in real-time while exercising. This will encourage them to improve their appearance which in turn will improve upon their health, generate a positive self-image and motivate them to exercise more frequently and more intensely than they otherwise would. For safety, a limit can be set on how thin the image can be displayed to prevent any problems with someone who may suffer from Anorexia or Bulimia.

A further benefit of the present invention is that the real-time thinner image of the user will remain in his mind causing him to draw upon his memory of his thinner image when shopping for food, when cooking and when selecting meals at a restaurant. Studies from major universities have proven that improving someone's intrinsic motivation, autonomy and internal dialog has a powerful effect on their diet and exercise habits for the long term.

A further goal of the invention is to provide validation of the user or patient's identity while exercising to further engage and motivate the user to exercise more frequently and for a longer period of time. Current wellness programs, medical treatment plans, exercise personal training schemes and the like, have a strong need for a device or process that will confirm the true identity of the user or patient.

Through a unique interface of the camera on the computer device and exercise machine, the user's identification and method of exercise is confirmed during the exercise routine that was not available in the prior art. This can be used on any computer device including but not limited to a television, cell phone, tablet, laptop or desk top computer, or the like. One example of using the camera on the computer device to validate the user is to take a still image or short video of the user during their exercise routine. The image taken can be at preset intervals, say of every 10 minutes during their exercise routine. Thus, as long as the treadmill is moving the camera will operate to take their real time image while exercising. If the user stops exercising, the camera will no longer record images. This is used to keep the user engaged and motivated. For example, the user knows if they just push a little longer for 10 more minutes, it will cause the camera to take their image, thereby perhaps obtaining more of a discount on their health insurance costs. Setting a short goal within their exercise routine will motivate the user to exercise longer because such short term goals are just within reach. This information can be sent to someone in the medical industry or wellness manager to confirm the user's amount of exercise and validating the user's identity. This can be used in combination with GPS to confirm the location, such as a gym location. This information can be sent as a live feed through the use of technology similar to Skype or stored as a still image or video and may be sent at anytime.

This user's exercise and identity data is then easily transferred to a wellness manager or doctor over the Internet as a live feed or stored on a computer or remote server such as a cloud based server in order to obtain such data at any time or location. Validation can also achieved by facial, iris recognition, voice recognition, DNA profile information, and finger print scanning.

With the user now having the ability to not only view her improved appearance during the exercise process in real-time, but also now having the simultaneous ability to view her improved biometrics during the exercise process in real-time, a synergy is created that fosters the duel benefits of appearance and health. By displaying to the user or patient the health benefits of her exercise in real-time and by creating a more efficient flow of that data to her wellness program manager, a physician or personal trainer, the user or patient's autonomy, motivation and participation is increased beyond what current technology and fitness programs provide. Notwithstanding the advances in the arts related to the invention disclosed here, there has not been a much needed proposed integrated device the combines validation, motivation and biometric testing in one solution that through proper computer implemented instructions, provides a new robust system with unexpected results that allows a convenient, cost effective method of transferring health data while at the same time validating and motivating the user. This invention benefits the wellness programs and medical industries that desperately need to validate the employee or patient; while also providing significant cost savings that is not otherwise available. This invention has the dual benefit of helping the employee or patient save time and money while boosting participation in their wellness programs and/or medical care.

There is a need to provide a simplified and convenient way of performing biometric screenings by empowering the user to do herself and easily transfer that information to her wellness manager or doctor, thus enhancing the exercise motivation and validation features of the invention, while saving money and fostering self-autonomy. The biometric testing has to operate along with the validation feature so that the health care professional or wellness manager can confirm the user's identity as explained further below.

Therefore, a further goal of the invention is to perform basic biometric testing such as cholesterol, blood-glucose, blood pressure, current weight and the like using a computer device to further enhance motivation and display the positive progression of a person's health if they stick to an exercise routine. This can be used on any computer device including but not limited to a television, cell phone, tablet, laptop or desk top computer, or the like. By showing the user their thinner image for motivation, it is fitting to also have the ability to show them their internal payoffs through the biometric testing feature.

Biometric testing is an important component of a comprehensive health and wellness program. For patients or employees, biometric testing provides important baseline data to shape the direction of their health and/or corporate wellness programs. These screenings provide information on current and potential medical issues. By using this test, users have reliable information about their risk for chronic preventable diseases such as diabetes, heart disease, and hypertension.

The screenings that are used by the wellness programs currently are usually performed off site or commonly in a large mobile unit in the employer's parking lot. By the use of the invention, it would save time and money by allowing the employee to test themselves and send the information over the internet to the wellness manager or medical worker, or to store on a remote server such as a secure cloud based server in order to obtain data at any time or location, thereby boosting the user's self-autonomy and participation in the programs.

The present invention also provides a means for closer communication, better care and synergy between the patient and doctor. For example, one can prevent or delay the onset of type-2 diabetes by establishing and monitoring a diet and exercise plan with one's physician. If the spread of type-2 diabetes continues at its present rate, the number of people diagnosed with diabetes in the United States will increase from about 16 million in 2005 to 48 million in 2050. The good news is that type-2 diabetes is largely preventable. About 9 cases in 10 could be avoided by taking several simple steps: keeping weight under control, exercising more and following a healthy diet.

By utilizing the motivation, validation and biometric screening features disclosed here, the patient is motivated to exercise and maintain a goal journal of her workout routine which a doctor can easily track and record while monitoring the patient's improved health. Using the validation process of the invention, the patient's identity and exercise routine are confirmed simultaneously. The validation feature may be used while exercising or not engaged at all in exercising. Perhaps the patient needs to transfer their biometric testing results, diet plan or just a simple question to their health care professional. With the use of the validation features this information can easily be transferred to a doctor for the patient's records and further consultation. Current fitness products such as Fitbit pedometers fall short in this area because there is no way to confirm the identity of the user or patient or to provide a visual motivation stimulate by showing the user a thinner image of themselves while exercising, nor can such devices provide biometric testing.

All or part of the comprised aggregate data such as the user's identity, duration of exercise, calories burned and heart rate level from his workout as well as the biometric testing performed by the user and validation of the patient, is conveniently transferred to the doctor for the patient's records and further consultation. This creates a closer connection between the doctor and his patient by including the doctor in the patient's fitness program on an ongoing basis.

According to a Harvard study, with tax incentives and grants available under recent federal health care legislation, U.S. companies can use wellness programs to chip away at their enormous health care costs, which are only rising with an aging workforce. It has been proven that healthy employees cost the employer less. Doctors Richard Milani and Carl Lavie demonstrated that point in a study that was published in the Harvard Business Review. The study was conducted using a single employer, using a random sample of 185 workers and their spouses. The participants were not heart patients, but they received cardiac rehabilitation and exercise training. Of those classified as high risk when the study started (according to body fat, blood pressure, anxiety, and other measures), 57% were converted to low-risk status by the end of the six month program. Furthermore, medical claim cost had declined by $1,421 per participant, compared with those from the previous year. A control group showed no such improvements. The bottom line is that every dollar invested in the intervention yielded $6 in health care savings.

Many organizations use online employee Health Reimbursement Arrangement (HRAs) to guide investment surveys and the results from biometric tests such as blood pressure, cholesterol, glucose and body mass index. This information is shared confidentially with each participant to help him or her track wellness progress and, when appropriate, receive company-provided assistance in an area such as nutrition counseling. Employees can often complete their biometric tests at company health fairs or on-site medical clinics. The current invention will encourage employee participation in the HRAs because of the convenience and ease of use. Furthermore, instead of setting up expensive health fairs or mobile medical clinics in the employer's parking lot, the HRAs save money by having a more efficient way of performing the biometric testing while encouraging employee participation.

It is a goal of this invention to create a synergy between the employee, employer and the wellness program that is missing in the healthcare industry today. This will result in increased employee participation in these programs. Some employees who complete an HRA and receive the recommended health counseling are rewarded by having their personal health insurance contributions substantially reduced. And as mentioned, the employer and health insurance companies save money as well if the employee will participate.

As an example, participation is enhanced because the employee can use the invention at home on her TV or computer device in order to save the time and money associated with going to the gym and possibly having to pay for childcare. Many wellness programs provide a discount to the employee on her health insurance costs for participation in the program as mentioned previously. She now is better able to achieve the requirements of her wellness program which helps her obtain the discount on her health insurance without leaving home. This added benefit will motivate more employees to participate in company wellness programs because of the ease and convenience provided by this invention. And the validation feature allows her to confirm her identity as well. There is a need for the unique features of this invention that solve the problem intrinsic in today's wellness programs by validating the identity of the user and the exercise performed which cannot be accomplished with the use of a swipe card at the gym or a pedometer due to the ease of providing those devices to a friend who will record erroneous exercise data for the defrauding employee to use to obtain discounts and other company benefits.

When using the invention through a portable computer device such as a computer tablet, smart phone, or the like in a hotel exercise room, the employee can easily meet his exercise goals when traveling. When in use, the camera can automatically redact any background images for privacy reasons. If the user does not want or need to use that particular validation feature, then he can simple turn it off.

This invention can also be easily and affordably merged into a fitness manufacture's current control and entertainment panel screen on their exercise machines. Precor for example, is one of the top fitness manufactures and is making the connection with their own network fitness capability with their Preva Network program. Preva Network gives facilities the option of enabling web browser capability so users can access their favorite websites during their workout and track their exercise routine. The program also allows owners of the gyms to track the use of each machine remotely.

Although this system is entertaining for the user, it is lacking in the motivation by allowing the user to see themselves thinner the harder they exercise, confirming the ID validation, and biometrics read if desired from one system. Also there is no way using their current program to send this aggregated information over the internet as previously explained. This is a great connection and works nicely together with the wellness programs and the exercise manufactures that give users new and unexpected results that they currently do not have.

It is my belief that the invention disclosed here will create synergy and enhance employee/patient participation because of the ease and convenience of its use. Furthermore, wellness programs will operate more efficiently because of the invention's validation feature which is missing today and because of the user's ability to perform her own biometric testing. Employers will benefit from the invention by virtue of its employee's increased participation in exercise and diet programs which will increase productivity in the workplace and reduce the healthcare costs that is so desperately needed. Indeed, the negative impact of stress related illnesses such as depression and anxiety will be significantly reduced which in turn reduces the incidence of divorce and violence in the workplace. Indeed the benefits of this much needed invention when utilized to its fullest are boundless.

A weight measurement of the exercise may be taken from a stretch resistance band that has a sensor inside the band. It is worn by a user by placing the stretch resistance foot band sensor under around the foot of the user; calculating the user's weight based on small button size scales with a diameter of approximately ⅓ in., that are included inside of the foot band. Bands are interfaced with the computer and wirelessly through the use of Bluetooth technology or the like; allowing the foot band to automatically sync with the computer, thereby providing the user with their current weight and automatically sending the information to the computer device.

Interfacing between the exercise machine and the computer device by means of a code, it is now possible for to operation of the exercise machine to be controlled by a computer device. For an example, if using a tablet connected directly by USB port or another form of hardwire directly to the exercise machine, it is possible to control the exercise machine directly on the tablet. The controls of the exercise machine operate through the tablet such as—in the case of a treadmill—speed of the treadmill, elevation and duration. This can also work wirelessly through a code that is read by the computer device outputted from the exercise machine. The exercise data from the user's workout routine on the exercise machine such as speed, duration and calories burned are automatically entered into the computer device from the exercise machine.

The user may input in the electronic device personal data such as gender, age, height and weight and personal measurements. Then the user inputs the weight that they would prefer to be and a thinner image will be displayed accordingly. The image thinning of the user is achieved by data manually entered by the user into the computer device in order to see their thinner image. This is either or both a real-time video or a still image of the user.

When using an exercise machine such as a treadmill, the action of the interface between the treadmill and the computer causes the user's real time video image to become thinner, healthier and more aesthetically pleasing. The faster and/or more intensely the user exercises, the thinner and more appealing the user's image becomes. In addition to seeing her image, she can also view on the computer screen her exercise data such as heart rate, calories burned and distance advanced.

Visually seeing the thinner image can be achieved all in one computer device or can also be achieved by using a camera on a computer device to input the user's image and thinner image outputted from the same computer device, but projected separately on another device such as a large flat-screen monitor or projected image on a wall, rather than the computer screen.

Through an interactive electronic adhesive skin patch worn on the skin, or through a wearable health monitor devices such as a bracelet or earpiece that uses an analysis layer and input/output interface, the ability is created to read the user's data while during exercising, such as heart rate and breathing rate. Through computer implemented instructions, the computer reads the increase heart and breathing rate from the health monitor devices or electronic skin patch and based on those readings the thinner image is created. This can be achieved by wire connection or wirelessly. As such, the interface between the electronic skin patch or wearable health monitor device allows the user to see a motivationally thinner image of themselves.

With the use of MEMS technology and bio-MEMS combined with micro-systems and nano-systems, physiological sensors, wearable health monitor devices with physiological sensors that are worn inside the ear of the user, bracelets or electronic skin patches are able to capture at least the heart rate and breathing rate, such data being transmitted to the computer device while exercising. As long as the computer device is reading the heart rate and breathing rate information from the ear piece, the image of the user will become thinner accordingly.

Body band devices such as arm, neck, stomach, head, leg and foot bands are another method of obtaining measurements, weight, heart rate, oxygen level, number of steps taken, and distance data from a stretch resistance sensor inside the bands worn by a user engaging in exercise. This can include placing one of the resistance sensor around the user's foot that is able to take the user's weight based on small button size scales that are a diameter of approximately ⅓ in., and that are fixed with the foot band. Bands are interfaced with the electronic device wirelessly through the use of Bluetooth technology or the like. Input from such devices is automatically synchronized by the computer device, and through a suitable computer implemented instruction set this data from the body bands may then be used to calculate and display an approximation of the user's thinner image based on current exercise levels and the other data received. As long as the bands are getting a reading of current measurements and/or steps currently taken and increased heart rate, oxygen level and steps taken the thinner image will appear, thereby motivating the user to press on with the exercise routine. Once data stops being read from the body bands, the image goes back to normal size on the screen. Weight of the user can also be taken from the treadmill if the treadmill is outfitted with a weight scale function.

Therefore, it is an object of this invention to contribute to the user's sense of self-worth and self-esteem. It is a further object to provide a method of intrinsic motivation by using real time thinning self-imagery; and to create a long last self-image impression that will enhance healthy food selections; and to provide biometric testing that enhances the user's exercise experience and engages the user's self-autonomy; and to narrow the gap between intention and action for the user by providing motivation to exercise and to participate in prescribed health programs; and to bridge the separation of the employee, employer and the healthcare company or the medical industry in a useful, resourceful, streamline manner that will increase employee participation; and to connect the gap that exist between the patient and the medical industry in a useful, resourceful way that will encourage patient care participation; and to provide not only accessibility and enhance capability of the wellness programs but also to save money for the employee, employer and the healthcare industry; and to provide not only accessibility and enhance capability of the patient's control of their medical care but also to save money for medical cost; and to provide a program that can be used on an electronic device to encourage use while traveling; and to provide a program that can be used in the convenience of a home environment; and to lessen the loss of productivity from sick time taken, including less depression and stress which have been proven to be in particular sources of loss of productivity; and to enhance participation in a wellness or diet program, reducing the growth of diabetes in the US and reducing health care cost in the US. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
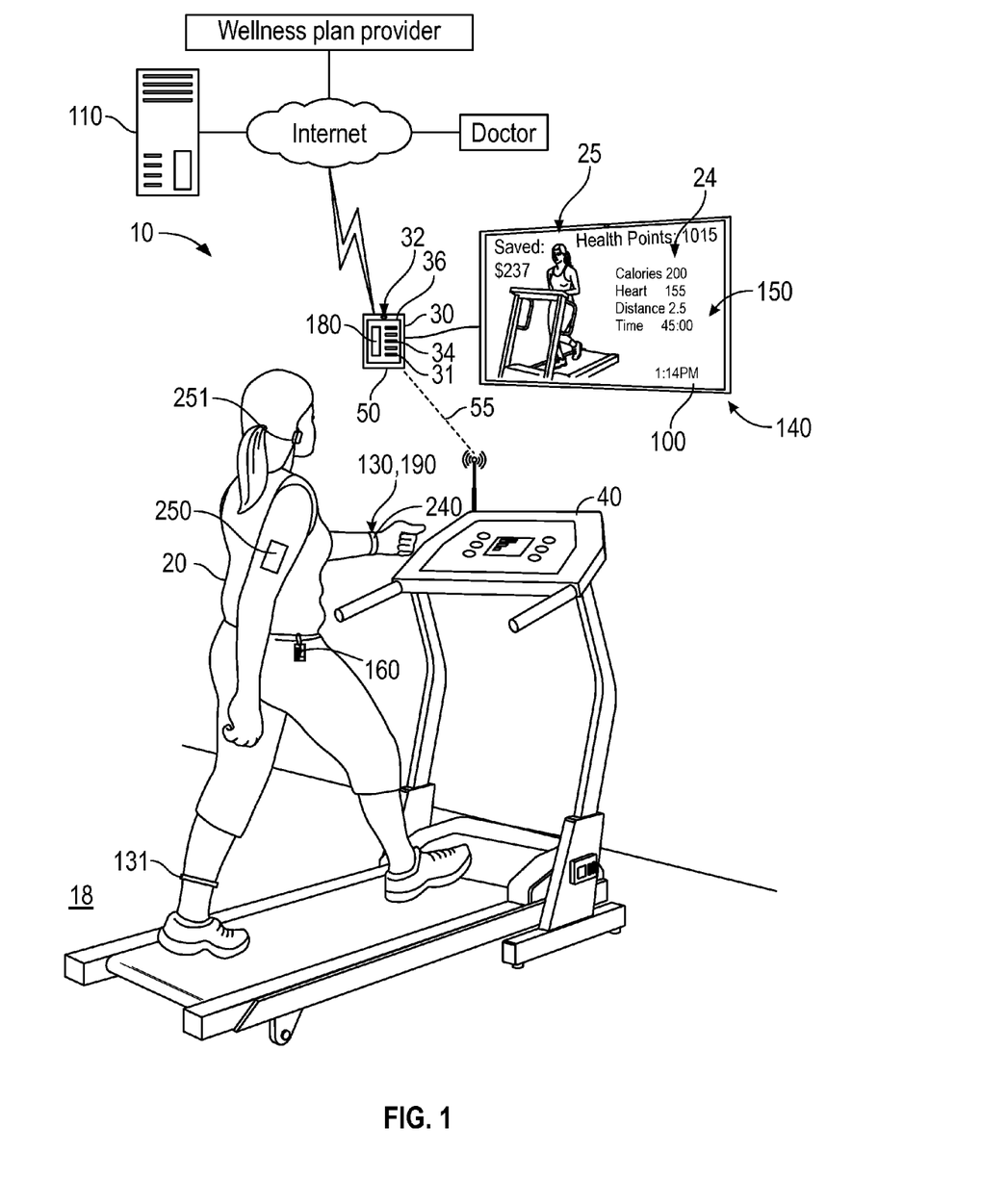
FIG. 1 is a perspective view of one embodiment of the invention.
Figure 2:
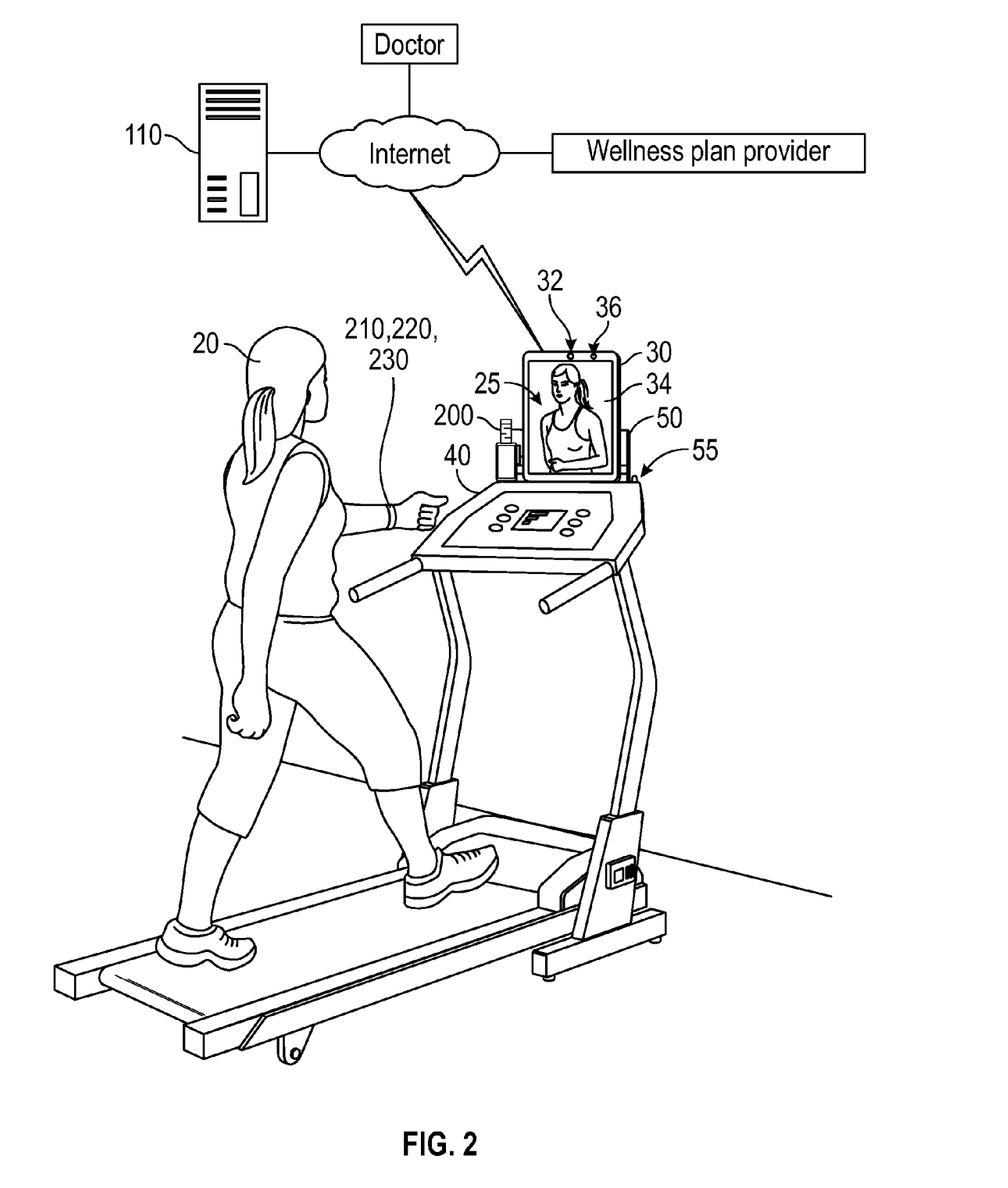
FIG. 2 is a perspective view of an alternate embodiment of the invention.
Figure 3:
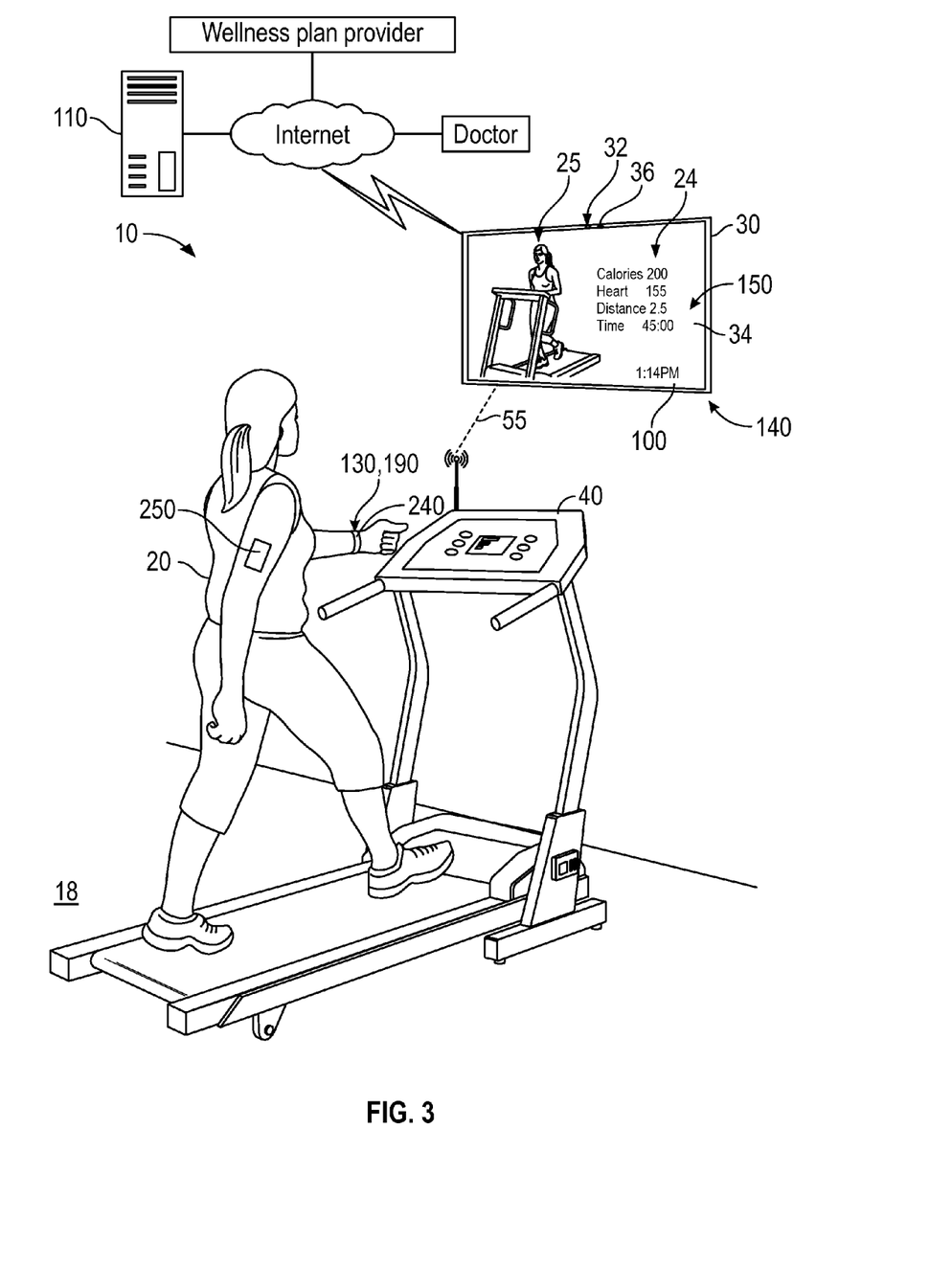
FIG. 3 is a perspective view of another alternate embodiment of the invention.

FIGS. 1 and 2 illustrate a system 10 for aiding a user 20 performing an exercise in an exercise area 18 utilizing an electronic device 30. The electronic device 30 is of the type that includes at least a non-volatile storage medium 31, a camera 32, a display 34, a microphone 36 and at least periodic access to the Internet or other large area network. Such an electronic device may be a wall-mounted television, cell phone, tablet computer, laptop or desk top computer, or the like.

An adjustable mount 50 secures the electronic device 30 in such a way as to orient the camera 32 of the electronic device 30 towards the user 20 in the exercise area 18. The mount 50 includes a mechanism for securing to the electronic device 30 and for securing to a wall, exercise machine 40, or the like.

A server 110 with access to the Internet is further included and is adapted to receive information from the electronic device 30, which can then be sent to the user's doctor, wellness program, or other authorized practitioner. Such information may include user identity validation information from the electronic device 30, as further explained below, as well as data from the exercise machine 40, biometrics, motivational image statistics, and image and modified motivational image 25 data from the electronic device 30, and data from alternate validation systems, dollar amounts saved, health points earned, and other data, as further explained below.

A set of computer-implemented instructions resident in the non-volatile storage medium 31 of the electronic device 30 is adapted to cause the camera 32 to record a still or video image or produce a live feed of the patient or exercising user 20 when movement is detected by the camera 32. Further, the electronic device 30 is instructed to use an identity validation system 130 to validate the identity of the user 20 performing the exercise, and to transmit to the server 110 at least the user's identity as determined by the identity validation system 130 and the time 140 and duration 150 of the exercise performed by the user 20.

In one embodiment, wherein the exercise area already includes the exercise machine 40 that is adapted for transmitting exercise data 24 to an interface 55 thereof, the electronic device 30 is further adapted to receive the exercise data 24 from the exercise machine 40 and then transmit the exercise data 24 to the server 110. Additionally, the electronic device 30, as directed by the instructions therein, may prompt the user 20 for additional health data 24, such as height, weight, gender, age, blood pressure, average heart rate, desired weight, desired blood pressure, desired average heart rate, and the like.

The health data 24 may additionally include an image of a blood test strip, such as a blood cholesterol or glucose test strip 200, blood pressure data of the user 20 as determined by a blood pressure monitor 210 in the exercise area 18, heart rate data of the user 20 as determined by a heart rate monitor 220 in the exercise area 18, blood oxygen concentration data of the user 20 as determined by a blood oxygen monitor 230 in the exercise area 18, and the like.

Preferably the electronic device 30 is further adapted, through the set of instructions, to display a motivational image 25 on the display 34 of the electronic device 30 in accordance to the speed or duration of the detection of movement of the user 20 by the camera 32. Such a motivational image 25 relates to the shape of the user 20 as detected by the camera 32 of the electronic device 30, and is preferably a thinner representation of the user 20. Such a motivational image 25 may further be determined by the shape of the user 20 as detected by the camera 32 of the electronic device 30 and in accordance to the exercise data 24 of the exercise machine 40. The thinner motivational image 25 may also be determined in part by parameters entered by the user 20, provided by health tracking devices such as a body band 230, electronic skin patch 250, earpiece 251 or bracelet, and other exercise data 24. The motivational image 25 may be a real-time image displayed to the user 20, or a live feed image broadcast to a remote location.

The thinner motivational image 25 may be further transferred to the server 110 for use in motivational emails, or the like. A separate display 34, such as a flat-panel display or television, may be interfaced with the electronic device 30 (FIG. 1) to display the image 25 and exercise data 24.

Validation of the user's identity during exercising may be achieved through any of the following: 1) the exercise machine 40 indicates movement thereof at the interface 55 with the electronic device 30, resulting in the set of instructions causing the camera 32 to periodically take a photo and send it to the server 110; 2) movement is sensed by the camera 32 (such as the user's shoulders moving up and down), resulting in the set of instructions causing the camera 32 to periodically take a photo; 3) a DNA validator electronic skin patch 250, electronic bracelet 130, or an electronic earpiece 251 reads a DNA signature from the user 20; 4) the camera 32 of the electronic device 30 enables facial recognition routines included in the set of instructions to identify the user 20; 5) a barcode ID (not shown) of the user, such as is found on a government-issued ID for example, is scanned by camera 32; 6) voice recognition is performed by the electronic device 30 through use of the microphone 36; 7) an image of the user's iris is scanned and compared to a previously-validated image thereof; 8) a fingerprint scanner 180 is utilized to scan the fingerprint of the user 20; or the like. It is understood that as additional identity verification systems and devices become available that the present invention may be adapted to accommodate such new technologies without changing the spirit or scope of the invention.

The camera 32 may take a still image or real time video of the user 20 according to output parameters of the exercise machine 40 transmitted by wire, wirelessly by Bluetooth technology, infrared communication, or the like. The image can be captured at pre-set intervals. For example, as long as the exercise data 24 is being produced by the exercise machine 40, the camera 32 can be instructed to capture the user's image every 10 minutes. Therefore, as long as the user 20 continues exercising, the camera 32 will continue to capture the user's image. For privacy, background images may be automatically obscured, if desired. Additionally, upon the camera 32 sensing movement of user 20 (such as shoulder movement up and down of the user 20) on an exercise machine 40, or within the exercise area 18, the camera 32 can be set to capture the user's image at the pre-set intervals.

With the use of MEMS technology and bio-MEMS combined with micro-systems and nano-systems, a DNA validator 190 such as an electronic skin patches 250 or wearable health monitors in the form of a bracelet 130 or electronic ear pieces 251 can provide a DNA signature of the user 20. Thus, wearing these devices 190 that are interfaced with the electronic device 30, either by wire or wirelessly, provides validation of the user's identity.

A facial recognition routine may be used for automatically identifying and verifying a user from a digital image or a video frame. The image taken is matched to one single image in a database. For example, an image taken of a user is compared to all of the images that are stored in a database (not shown), resulting in the single best match that is in the database.

To further help validate the identity of the user 20, the bar code 160 associated with an ID card, such as a driver's license, is scanned by the camera 32 and is then compared to a known bar code 160 associated with the user 20. This can be achieved by simply implementing a bar code 160 that is located on a government ID, or a newly-issued swipe card that is coded with the user's identification information. The camera 32 on the electronic device 30 reads the bar code 160 and identifies the user 20.

In order to create a base line vocal pattern for speech recognition identity validation, a speech sample of the positively identified user 20 is segmented and dominant frequencies called formants are determined. The segments are then digitized into a biometric template. Thereafter, when authenticating a user's voice, the previous voice basis in the database is compared to the current voice that is being identified by matching an assigned questions or phrase. Voice identification is quickly and accurately captured by the microphone 36 and processed by the electronic device 30 or a remote voice identification server (not shown).

Through the computer implemented instructions and by utilizing the camera 32 on the electronic device 30, user iris recognition may also be used as an automated method of biometric identification that uses mathematical pattern-recognition techniques on video images of the iris of the user's eyes. The complex, random patterns of a person's iris are unique and can be seen from some distance. The unique pattern that is being authenticated is then compared to others in a database, thus allowing the user's identity to be confirmed.

Through suitable computer implemented instructions, impressions of fingerprints of the user 20 are placed on the smooth surface of the display 34 of the electronic device 30 display. By the use of natural secretions of sweat from the eccrine glands that are present in friction ridge skin a unique finger print is captured from the user. Through proper computer implemented instructions, the electronic device 30 is able to read the finger print and properly identify the user 20. This can be achieved by capturing the fingerprint of just one figure, such as the thumb, or the whole hand, as desired based on the size of the electronic device 30. Alternately, a separate fingerprint scanner 180 within the exercise area 18 may be used.

With the use of test strips 200 that take a small drop of blood, the camera 32 on the computer device is able to read slight changes on the strip 200; allowing determination of the reading to be given to the user 20 and associated healthcare workers. Alternately, by implementing algorithms such as what is used with OneTouch® Verio®Sync for example, a separate meter device automatically sends the user's blood sugar results wirelessly to the electronic device 30. By utilizing the camera 32 to sense small changes in facial color based on blood flow such as the Vital Signs Camera App by Phillips, heart and respiratory rates can be obtained. Blood volume pulse propagates throughout the body. During the cardiac cycle, volumetric changes in the facial blood vessels modify the path length of the incident ambient light such that subsequent changes in amount of reflected light indicate the timing of cardiovascular events.

Body band devices 240, such as arm, neck, stomach, head, leg band 131 and foot bands are another means of obtaining measurements, weight, heart rate, pulse rate and the like. By utilizing small button-size scales that are approximately ⅓ inch in diameter and located inside of the stretch resistant foot band, weight of the user 20 is obtained by placing the band around the foot and standing on it. Blood pressure, pulse and heart rate can easily be read from such band devices 240 wirelessly using Bluetooth technology or the like. However, separate blood pressure monitors and blood glucose meters can also be connected to the electronic device 30 directly as well through the use of a USB port or the like.

With the use of MEMS technology and bio-MEMS combined with micro-systems and nano-systems, physiological sensors are used in electronic skin patches 250 or electronic ear pieces 251 to provide an accurate reading for blood pressure, body temperature, bone density, pulse, heart rate, cholesterol and blood oxygen percentage, and such can be read wirelessly using Bluetooth technology or the like. Thus, wearing these convenient devices 240,250 that are interfaced with the electronic device 30 provides real time biometric data 24 of the user 20.

The user 20 may enter her employer's wellness or weight loss requirement program, or details of a point system of the user's diet and health plan, into the electronic device 30. This aggregated information is then compared to her current exercise routine that the user 20 is performing and her points or dollars saved are displayed on the display 34 in front of her as she's exercising (FIG. 1). The harder and longer the user 20 exercises, the higher her points or dollars reach in real time on the display 34. As such, this increases motivation for her to keep exercising for a longer period of time. This can be used in conjunction with the thinner image 25 of her or by itself to help motivate the user 20.

The user 20 may further input her current weight, measurements, age, gender, cholesterol, body fat, blood pressure and/or blood sugar into the electronic device 30, as opposed to when using the biometric devices 240,250 described above wherein some of this information is read directly from the electronic device 30 via wireless networking instead of being received as input from the user 20. Once the thinner image 25 is calculated using the aforementioned methods and inputs, whether directly from the user into the computer device or wirelessly from wearable devices such as the electronic skin patch 250, earpiece 251, bracelet 130 or body band 131, the system 10 can calculate what the user's stats would be if they weighed as much as the thinner image displayed, and such information is displayed on the display 34 accordingly. The thinner image 25 of the user 20 that is displayed also is displayed with an estimate of what the user's weight, measurements, cholesterol, body fat, blood pressure and blood sugar would be if the user 20 was indeed as thin as the thinner image 25 that is displayed, thereby motivating the user 20 to exercise with more intensity and for a longer duration than he might normally.

Another goal of the invention is the generation of data to study the effects of positive self-imagery or the like. For example the data obtained from the present system can be used to study the effects of self-imagery, motivation and autonomy, for the study of bulimia and anorexia, or for the study of positive feedback during exercise or sports activities.

In one embodiment, the motivational image 25 is a thinner representation of the user 20 as determined by data received from an electronic skin patch 250, earpiece 251, bracelet 130, and/or body band 131 (FIG. 1).

In the set of computer-implemented instructions is further adapted to display a savings amount and/or a health points total, as determined by entered parameters about the user 20, including the parameters of the user's height, weight, age, gender, measurements, desired weight, and health plan information corresponding to health plan rates based on the user's parameters. Further, the set of computer-implemented instructions may be adapted to display estimated health statistics of the user 20 based on the user's desired weight, such health statistics including blood glucose level, heart rate, and blood pressure.

While a particular form of the invention has been illustrated and described, it will be apparent that various modifications can be made without departing from the spirit and scope of the invention. For example, the system may be adapted to be used for a group of people, such as a yoga or exercise class. Alternately, the system may be adapted for use by people who are not exercising on an exercising machine. For example, mental health patients might use the system to assist in positive self-imagery such as a smile, self-esteem and autonomy exercises. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A portable electronic device comprising:
a camera structured to capture a live video image of a user while the user is exercising, the live video image depicting at least one feature of the user in real time;
a detecting device structured to determine when the user is exercising;
an identity verification device structured to receive input data from the user and determine an identity of the user;
a network communicator structured to transmit and receive communication signals;
a memory device structured to store exercise data; and
a processing device in electronic communication with the network communicator structured to: receive identification data from the identity verification device, receive the live video image, receive stored exercise data from the memory device, estimate a live enhanced appearance of the user based on input data including e live video image and the stored exercise data, and create a motivational image of the user, the motivational image exclusively depicting a real time and modified image of the at least one feature to exhibit the live enhanced appearance of the user; and
an output display structured to display the motivational image from the processing device in substantially real time and only while the user is exercising.

2. The portable electronic device of claim 1 wherein the identity verification device includes at least one of a camera structured to capture a still image of the user while the user is exercising, a microphone structured to receive sound data from the user, a barcode scanner, an iris scanner structured to capture data from the user while the user is exercising, a fingerprint scanner, a biometric scanner, a heart rate monitor, a facial recognition system, and DNA information.

3. The portable electronic device of claim 1 wherein the network communicator is operable for sending or receiving input/output signals to and from an exercise machine such as a treadmill, stationary bike, or rower.

4. The portable electronic device of claim 1 wherein the network communicator is in electronic communication with a remote server.

5. The portable electronic device of claim 1 wherein the stored exercise data includes health data.

6. The portable electronic device of claim 5 wherein the health data includes at least one of cholesterol data, glucose data, blood pressure data, heart rate data, blood oxygen concentration data, and food intake data.

7. The portable electronic device of claim 5 wherein the health data includes fitness goals such as a desired body weight, body mass index, or body fat percentage.

8. The portable electronic device of claim 1 wherein the motivational image displayed on the output display depicts the user with reduced body fat.

9. The portable electronic device of claim 1 wherein the motivational image displayed on the output display depicts the user with increased muscle.

10. The portable electronic device of claim 1 wherein the input data includes data entered by the user that includes at least one of gender, weight, height, other body measurements and a desired weight to establish a benchmark for calculating the live enhanced appearance of the user and wherein the motivational image is proportional to the desired weight.

11. The portable electronic device of claim 10, wherein the output display includes at least one of estimated cost savings and health points corresponding to health plan rates based on the desired weight of the user.

12. The portable electronic device of claim 10, wherein the output display includes estimated health statistics of the user based on at least one of the data entered by user; blood glucose level, heart rate, and blood pressure.

13. The portable electronic device of claim 1 wherein the detecting device includes one of the camera and a health tracking device.

14. A method for monitoring an exerciser comprising:
detecting an exercise session with a portable handheld electronic device;
capturing a live video image of the exerciser during the exercise session, the live video image depicting at least one feature of the exerciser in substantially real time;
verifying the identity of the exerciser;
determining the physical dimensions of the at least one feature of the exerciser from the live video image;
displaying only while the exercise session is detected a substantially live video of the exerciser, the substantially live video exclusively depicting a real image of the exerciser that has had the physical dimensions of the at least one feature modified to thereby show a live enhanced appearance of the exerciser as a motivational tool; and
transmitting data to a second electronic device.

15. The method of claim 14, wherein the identity of the exerciser is verified periodically throughout an exercise session.

16. The method of claim 14, wherein video of the exerciser is captured upon detection of movement of the exerciser.

17. The method of claim 14 further comprising receiving exercise data from an exercise machine and storing exercise data on a remote server.

18. The method of claim 14 further comprising receiving health data from a health monitoring device and storing exercise data on a remote server.

19. The method of claim 14, wherein the data transmitted to an electronic device includes at least one of exercise, health, identity data, or an image.

20. The method of claim 14, wherein the detection occurs automatically without user input to the portable electronic device.

21. The method of claim 14, wherein the modified physical dimensions displayed on the video includes reducing the appearance of body fat and/or increasing the appearance of muscle mass.

22. The method of claim 14, wherein the modified physical dimensions displayed on the video changes in proportion to a heart rate of the exerciser.

23. The method of claim 14, wherein the verifying of the identity and the displaying of the modified physical dimension occurs when a heart rate increase is sensed.

* * * * *